Dec. 15, 1931.  E. H. GODFREY  1,836,587
SPEED CHANGE DEVICE
Filed Nov. 21, 1928   2 Sheets-Sheet 1
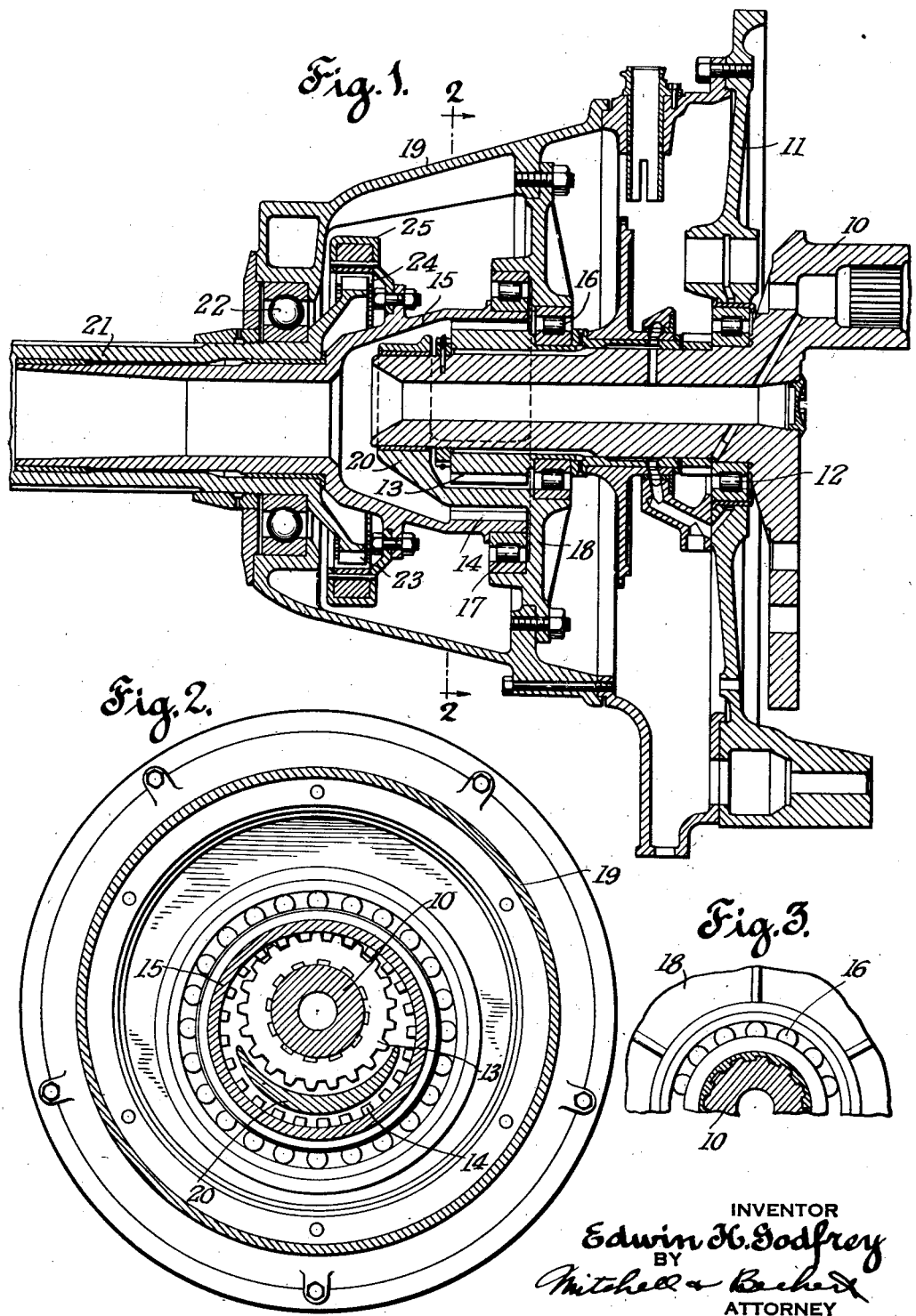

Dec. 15, 1931.  E. H. GODFREY  1,836,587
SPEED CHANGE DEVICE
Filed Nov. 21, 1928   2 Sheets-Sheet 2

INVENTOR
Edwin H. Godfrey
BY
Mitchell & Bechert
ATTORNEY

Patented Dec. 15, 1931

1,836,587

UNITED STATES PATENT OFFICE

EDWIN H. GODFREY, OF WEST HARTFORD, CONNECTICUT, ASSIGNOR TO THE PRATT & WHITNEY AIRCRAFT CO., OF HARTFORD, CONNECTICUT, A CORPORATION OF DELAWARE

SPEED CHANGE DEVICE

Application filed November 21, 1928. Serial No. 320,963.

This invention relates to speed change devices, and in particular to a gear type speed reduction unit adapted primarily for application to an aircraft engine.

A primary object of the invention is to provide a gear reduction unit between the crank-shaft and propeller hub of an aircraft engine which will be simple in construction and efficient in operation.

Another object of the invention is to provide a driving gear on the crank and driving shaft of an aircraft-engine adapted to mesh with a gear upon a driven shaft, the driving shaft being supported preferably by antifriction bearings mounted closely adjacent the driving gear.

A further object of the invention is to provide a supporting member in the form of a flange rigidly mounted within the engine frame and within which are mounted two closely adjacent bearings of the antifriction type, one supporting a portion of the driving shaft and the other bearing supporting a portion of the driven shaft.

Another object of the invention is to provide a support having intermediate antifriction bearings, the support having an inwardly extending flange member secured at its periphery to one of the engine frame members.

Another object of the invention is to provide an outer bearing on the forward end of the crank-shaft, this bearing being mounted upon an extension of the support for the two intermediate antifriction bearings.

A still further object of the invention is to provide a flexible connection between the driven shaft and a sleeve surrounding it upon which the propeller may be mounted.

With the above and other objects in view, my invention comprises the features of construction and operation set forth in the following specification and illustrated in the accompanying drawings.

In the drawings—

Fig. 1 is a longitudinal sectional view through the forward end of an aircraft engine showing one of my improved forms of speed reducing device applied thereto;

Fig. 2 is a transverse sectional view of said form taken upon the plane of line 2—2 of Fig. 1;

Fig. 3 is a detail cross sectional view showing the antifriction bearings mounted directly upon the hub of the driving gear.

Figure 4:
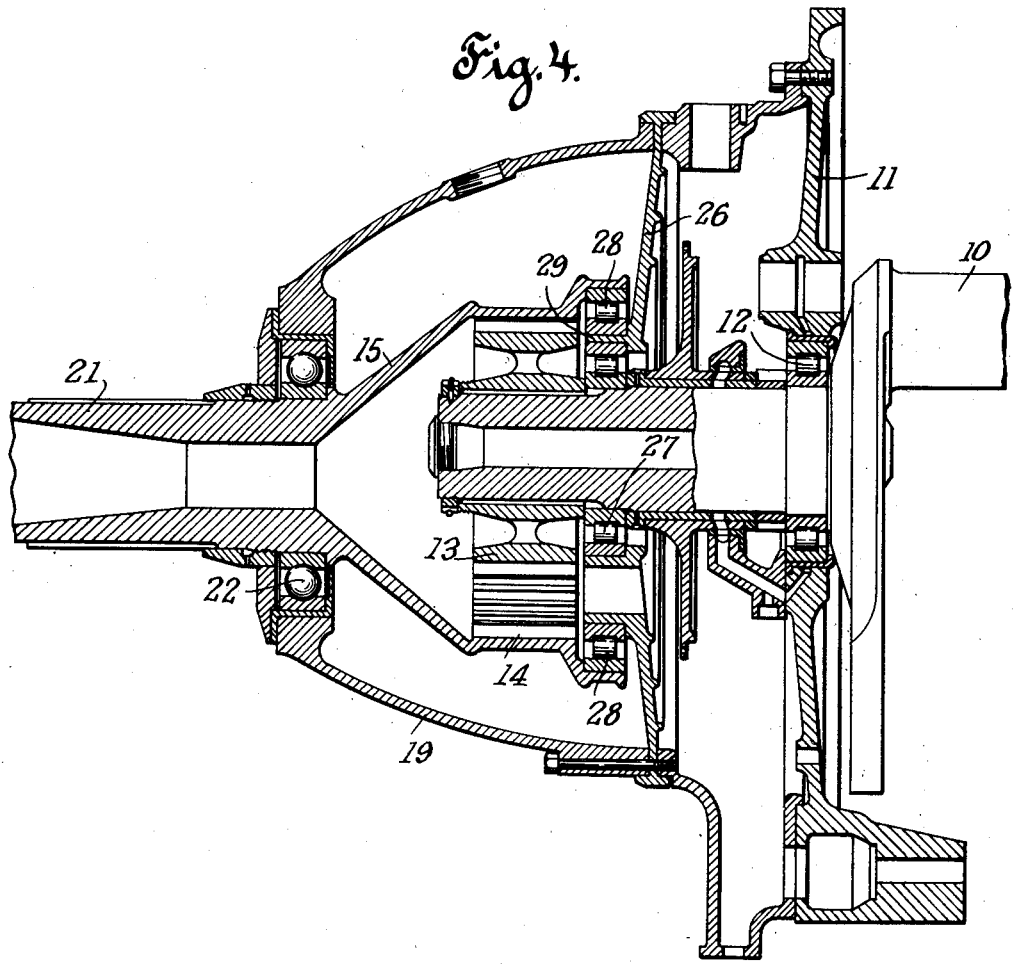
Fig. 4 is a view similar to Fig. 1, showing a modified form of the invention.

In the above mentioned drawings, I have shown several embodiments of my invention as applied to an aircraft engine, but it will be understood that the invention can be otherwise embodied, and that the drawings are not to be construed as defining or limiting the scope of the invention, the claims appended to this specification being relied upon for that purpose.

In aircraft power units it is frequently desirable to operate the engine at one speed and the propeller at a different speed, usually the engine being driven at its highest efficient speed to develop maximum power, and the propeller is driven at a reduced speed relative to the engine in order that the propeller may be used at its maximum efficiency. One engine may be used in a large variety of aircraft requiring for their efficient operation propellers having widely different characteristics. This necessitates a large number of different speed ratios between the engine crank-shaft and its propeller depending upon the particular propeller and the particular airship with which the engine is used. The present invention, therefore, more particularly relates to a speed reducing unit adapted to be interposed between the crank-shaft of an aircraft engine and the propeller hub of the power plant which will permit a wide selection of sizes in the cooperating members, so that the unit may be designed for any one of a large number of ratios.

Referring more in detail to the figures of the drawings, I show the forward portions of a crank-shaft 10 of an aircraft engine rotatably mounted within a front engine frame member 11. In order to rotatably support this crank-shaft 10 within this frame member 11, an antifriction bearing 12 is provided directly engaging a portion of the crank-shaft 10 adjacent the crank and retained in position within the engine frame member 11. An intermediate portion of the forward end of the crank-shaft 10 is suitably splined and upon this splined portion is mounted a driving gear 13. This gear 13 is suitably retained in axial position upon the crank-shaft 10 and is directly in mesh with teeth of an internal gear 14 formed on the rear end of a hollow driven shaft 15. The rear portions of this driven shaft 15 are suitably enlarged as shown in Fig. 1.

In order to support the driving shaft 10 and the driven shaft 15, bearings 16 and 17 are provided supported within a flange member 18 inserted within a housing forming an engine frame member 19 at an intermediate point. This flange member 18 is rigidly secured to the engine frame member 19 at its periphery. One of the bearings 16 within this flange member 18, is of the antifriction type and engages the driving shaft 10 closely adjacent the driving gear 13. The other antifriction bearing 17 upon this supporting member 18 engages the driven shaft 15 at its rear enlarged portion.

In Fig. 1 the antifriction bearing 16 is shown closely adjacent the driving gear 13, and mounted directly upon a small sleeve extension of the gear 13 surrounding the driving shaft 10. The second antifriction bearing 17 engages the driven shaft 15 directly over the gear teeth of the driving gear 13 and driven gear 14. Fig. 4 shows the antifriction bearing on the rear end of the driven shaft 15 mounted beyond the driven gear 14 and upon a still further enlarged portion of the driven shaft 15.

The outer or free end of the driving shaft 10 is of slightly reduced diameter, and free from splines so that it forms a journal member rotating within a bearing 20 housed within the enlarged portion of the driven shaft 15. This bearing 20 surrounding the journal portion at the free end of the driving shaft 10 is formed integrally with the flange member 18 and extends through the crescent shape opening between the driving and driven gears 13 and 14. The section of this member 18 at the point where it passes through the space between the gears 13 and 14 being indicated clearly in Fig. 2.

Surrounding the front portions of the driven shaft 15 is a sleeve 21 to the forward portions of which may be attached the propeller hub, (not shown). A suitable antifriction bearing 22 surrounds this sleeve 21 and supports the driven shaft 15 therefrom. The rear portion of this sleeve 21 is enlarged as shown in Fig. 1 and is provided with a plurality of teeth 23 at its periphery. These teeth 23 are in loose engagement within internally formed teeth 24 on a member 25 secured to the driven shaft 15. These loosely engaging teeth 23 and 24 form a flexible driving connection between the driven shaft 15 and the sleeve 21 on which the propeller is mounted. These two members 15 and 21 rotate at similar speed and mutually support each other.

Referring to the modification of the invention shown in Fig. 4 it will be seen that the flange member 26 supporting the antifriction bearings 27 and 28 is of different form from member 18 and that the bearings 27 and 28 supported upon this member 26 are directly in alignment with each other, one being disposed within the other but eccentric thereto. The inner bearing 27 has its inner ring directly engaging the driving shaft 10 and its outer ring engaging a circular projection 29 on the flange member 26. The outer bearing 28 has its inner ring engaging the outer surface of this circular projection 29 and its outer ring engages the internal cylindrical surface at the inner extended end of the driven shaft 15 the diameter of which is suitably enlarged as shown.

I claim:

1. A speed changing device comprising in combination, an engine frame, an inwardly extending flange member attached to said frame, a driving shaft rotatably mounted therein, spaced bearings for said driving shaft, one of said bearings having a support in said frame and the other in said flange member, a driving gear on said shaft, a driven shaft having a gear thereon in mesh with said driving gear, bearings for supporting said driven shaft, one of said bearings being supported in said flange member, a sleeve surrounding said driven shaft, a flexible connection between said driven shaft and said sleeve, and unitary supporting means for said driven shaft and sleeve.

2. A speed changing device comprising in combination, an engine frame, a flange member attached thereto, a driving shaft rotatably mounted therein, spaced bearings for said driving shaft respectively in said frame and flange members, a driving gear on said shaft, a driven shaft having a gear thereon in mesh with said driving gear, a bearing within said flange member supporting the rear end of said driven shaft, a sleeve surrounding the forward portion of said driven shaft, a bearing for rotatably supporting said sleeve and said driven shaft upon said frame, and a flexible connection comprising intermeshing gears between said driven shaft and said sleeve.

3. A speed changing device comprising in combination, a driving shaft having a gear mounted thereon adjacent one end, supporting means for said shaft comprising spaced bearings, one of which is closely adjacent said gear, a frame member having an attached flange member in which said bearing adjacent said gear is mounted, a driven gear meshing with said driving gear, said driven gear being formed on a sleeve, and supporting means for said sleeve comprising spaced bearings, one of which is closely adjacent the outside of said driven gear and mounted within said flange member.

4. A speed changing device comprising in combination, a frame member, a crank-shaft, a bearing supporting said shaft within said frame member, a housing member rigidly attached to said frame member, a flange member inwardly extending from said frame and housing members and attached to one of said members at its periphery, a bearing within said flange member for said shaft, a driving gear on the outer end of said shaft, a sleeve member having a gear thereon meshing with said driving gear, and a bearing for said sleeve member adjacent its gear and supported within said flange member.

5. A speed changing device comprising in combination, a frame, a driving shaft rotatably mounted therein, spaced antifriction bearings for said driving shaft, a support for one of said bearings in said frame, a driving gear on said shaft, a driven shaft having a gear thereon in mesh with said driving gear, an antifriction bearing for said driven shaft adjacent its gear and in the same plane as a bearing for said driving shaft, and a supporting member for the bearing on said driven shaft and for one of said antifriction bearings for said driving shaft, said support comprising an inwardly extending flange member secured at its circumference to said engine frame.

6. A speed changing device comprising in combination, a frame, a driving shaft rotatably mounted therein, spaced bearings for said driving shaft, a support for one of said bearings in said frame, a driving gear on said shaft, a driven shaft having a gear thereon in mesh with said driving gear, a bearing for said driven shaft adjacent its gear, said bearing for said driven shaft and one of said bearings for said driving shaft being of the antifriction type, a flange member for supporting said last mentioned bearings, and a projection on one side of said flange member having eccentric cylindrical surfaces for supporting said bearings one within the other.

7. A speed changing device comprising in combination, a frame having a flange member attached thereto, a driving shaft rotatably mounted therein, spaced bearings for said driving shaft, a driving gear on said shaft, one of said bearings for said shaft being supported in said flange member adjacent its gear, a driven shaft having a gear thereon in mesh with said driving gear, a bearing for said driven shaft adjacent its gear and supported in said flange member upon the opposite side from said bearing for said driving shaft, and a supplemental supporting bearing for the outer end of said driving shaft, said bearing being formed on said flange member.

8. A speed changing device comprising in combination, a frame, a driving shaft rotatably mounted therein, spaced bearings for said driving shaft, a support for one of said bearings in said frame, a driving gear on said shaft, a driven shaft having a gear thereon in mesh with said driving gear, a bearing for said driven shaft adjacent its gear, said bearing for said driven shaft and one of said bearings for said driving shaft being of the antifriction type, and a flange member for supporting said last mentioned bearings, said flange member having eccentric cylindrical surfaces for supporting said bearings respectively upon their shafts.

EDWIN H. GODFREY.